United States Patent [19]
Hassenauer et al.

[11] 3,782,185
[45] Jan. 1, 1974

[54] RAILWAY TRUCK BRAKE TESTING DEVICE

[75] Inventors: Robert L. Hassenauer, Wilmette; Thomas J. Wolak, Cicero; George E. Novak, Riverside, all of Ill.

[73] Assignee: Evans Products Company, Plymouth, Mich.

[22] Filed: Aug. 21, 1972

[21] Appl. No.: 282,477

[52] U.S. Cl. ................................................. 73/121
[51] Int. Cl. ............................................. G01l 5/28
[58] Field of Search ...................... 73/121, 129, 94, 73/88.5, 398 AN

[56] References Cited
UNITED STATES PATENTS

| | | | |
|---|---|---|---|
| 2,721,919 | 10/1955 | Li et al. | 73/398 AR X |
| 2,377,212 | 5/1945 | Cotrell | 73/88.5 R X |
| 3,415,115 | 12/1968 | Newell | 73/121 |
| 2,518,906 | 8/1950 | Kocmich | 73/88.5 R X |

Primary Examiner—James J. Gill
Attorney—Rodney Bedell et al.

[57] ABSTRACT

A transducer device for converting a compression force, applied perpendicularly between two relatively sliding objects, into a tension force to be measured by a strain gauge rosette and, more particularly, for measuring a braking force when applied by a railway brake beam to a brake head and shoe unit in a direction normal to the periphery of a rotating vehicle wheel irrespective and independently of a tangential force due to friction between the wheel and the brake shoe unit. There exist devices for measuring a similar force applied normal to a railway wheel when stationary but they do not accurately measure such normal force under dynamic operating conditions because of the ancillary frictional force between the brake shoe and the rotating wheel. The present invention utilizes one or more bell cranks fulcrumed on a force-transmitting member so as to actuate a strain gauge rosette which can measure a tension force but cannot measure a compression force.

5 Claims, 4 Drawing Figures

PATENTED JAN 1 1974 3,782,185

RAILWAY TRUCK BRAKE TESTING DEVICE

DETAILED DESCRIPTION

Figure 1:
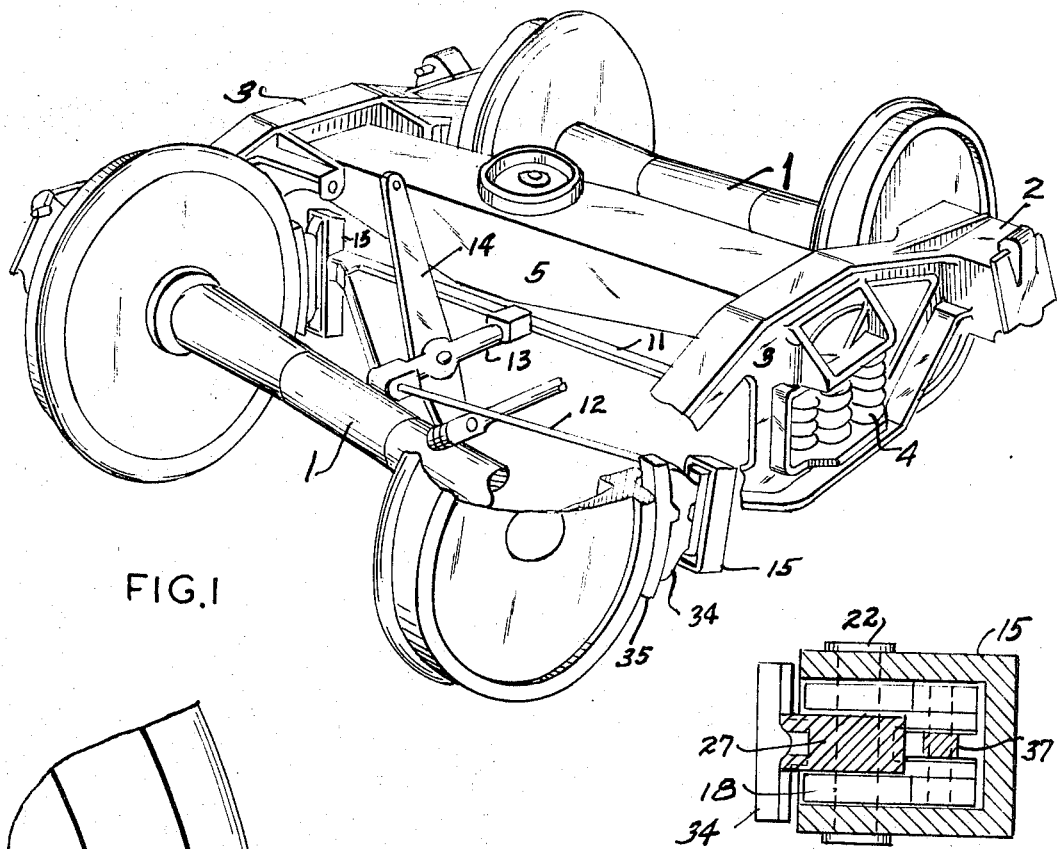
FIG. 1 is a perspective of a railway truck with a testing brake beam having terminal members applied to the wheels and including transducer means of the present invention.
Figure 4:
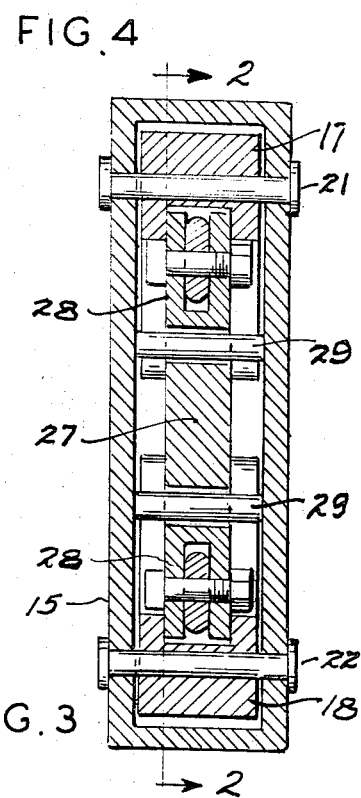
FIG. 4 is a horizontal section on line 4—4 of FIG. 2.

The truck includes a pair of wheeled axles 1, with journal boxes 2, or roller bearings, a truck frame 3 thereon, springs 4, a bolster 5 mounted on the springs, and brake beams supported on the truck frame through hangers or otherwise. Each brake beam is of truss type comprising a channel compression member 11, a tension bar 12 and a strut 13 which fulcrums a lever 14.

A box-like casing 15 at each end of the beam houses a pair of bell cranks 17, 18 lying one above the other in the same vertical plane and fulcrumed on casing 15 at 21 and 22 respectively. The bell crank arms 25 and 26 extend toward each other from fulcrums 21, 22 and are substantially aligned and their adjacent ends are connected by a load link 27 having jaws 28 receiving bell crank arms 25, 26 and pivoted thereto by pins 29. The openings for pins 29 are slightly elongated to accommodate some relative longitudinal movement of the bell crank, but no lateral play of the bell crank.

The other arms 31, 32 respectively of the two bell cranks are disposed angularly of arms 25, 26 and substantially parallel to each other. The ends of load link 27 are secured by pins 30 to spaced portions of a brake head 34 mounting the usual brake shoe 35. An elongated recording link 37 is pivotally connected at its ends to the outer ends of arms 31, 32.

Figures 2, 3:
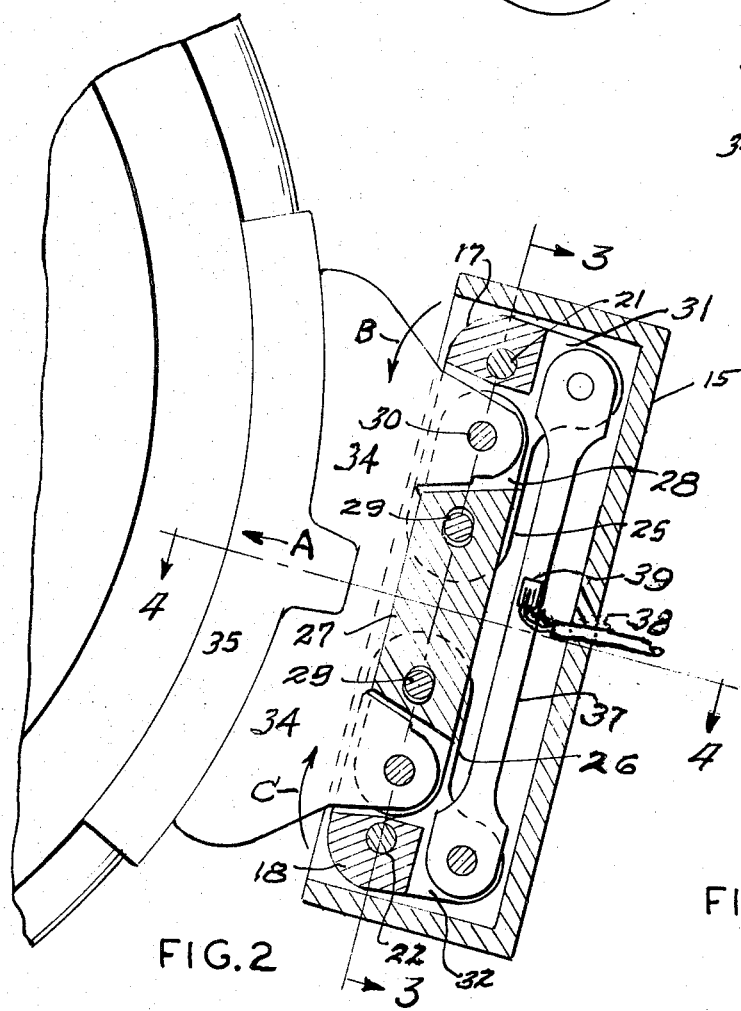
FIG. 2 is a vertical section through one end member of the beam taken transversely of the length of the beam on line 2—2 of FIG. 3.
FIG. 3 is a vertical section through an end member of the beam taken longitudinally of the beam on line 3—3 of FIG. 2.

When brake lever 14 applies a braking force through strut 13 and the brake beam in the direction of arrow A (FIG. 2) the bell cranks are rotated in opposite directions as indicated by arrows B and C and recording link 37 is placed under tension.

When the brake beam is thrust toward the truck wheels, two forces are applied to the shoes: a tangential force which retards the motion of the truck, and a normal force perpendicular to the shoe indicated by arrow A. When this occurs the head and shoe and load link assembly which are pinned to the interconnected bell crank arms causes the bell cranks to rotate a very slight amount. The other arms of the bell cranks are attached to the recording link and when the bell cranks rotate the recording link 37 is under tension. A strain gauge rosette 39 is bonded to one side of the recording link and is wired to form a Wheatstone bridge. When the recording link is loaded, the bridge becomes electrically unbalanced, causing electrical equipment (not shown), connected through cable 38, to measure the amount of unbalance which is proportional to the perpendicular force applied to the wheels. This force can be determined by measuring the amount of unbalance for given loads as determined by calibration.

The device gives desired information about the normal pressure applied to the wheel tread by the brake shoe independently of any force set up by friction between the wheel and the brake shoe, if the wheel is rotating, and the normal force applied to and through the shoe will be proportional to the load that is recorded in link 37.

The details described are illustrative of the brake testing embodiment of the invention, but the structure may be varied substantially without departure from the spirit of the invention as expressed in the appended claims.

We claim:

1. A device for measuring a compressive force applied in one direction between a railway truck brake shoe and wheel tread members, independently of a force applied in a transverse direction between said members, comprising a bell crank having a fulcrum on one of said members, anchorage means between one arm of said bell crank and the other of said members, an elongated tension element having a connection between one of its ends and the other arm of said bell crank, and a connection between the other end of said element and said first-mentioned member, respectively, and a strain sensitive gauge rosette mounted on said element intermediate said connections.

2. A device as described in claim 1 in which the anchorage means comprises a second bell crank having a fulcrum on the first-mentioned member spaced from the first-mentioned fulcrum, said bell cranks having two of their arms extending toward each other and interconnected and having their other two arms extending parallel to each other and interconnected by said tension element.

3. A railway truck brake testing device comprising a brake beam, a bell crank having a fulcrum on said beam with an axis parallel to the length of the beam, a brake block unit mounted on one arm of said bell crank, a link having one end connected to the other arm of said bell crank and its other end anchored to said beam, and a strain sensitive gauge mounted on said link intermediate the ends of the latter and registering tension strains.

4. In a railway truck brake testing device, an elongated brake beam, a bell crank frulcrumed on each end of said beam, a brake block unit mounted on one arm of each bell crank, a link secured at one end to the other arm of each bell crank and having its other end anchored to the beam, a strain sensitive gauge mounted on each link intermediate its ends, and a brake lever fulcrumed on the brake beam intermediate its ends.

5. In combination in a railway truck, a wheeled axle, a truck frame mounted thereon, an elongated brake beam supported by the frame, an upright box-like casing at each end of the beam having an open side facing the adjacent wheel, spaced upright bell cranks housed within each casing disposed one above the other and having individual fulcrums on side walls of the casing with their axes parallel to the open side of the casing, each of said bell cranks having an arm extending toward and connected to a corresponding arm of the other bell crank, each of said bell cranks having an arm extending angularly to said first-mentioned arm and away from the open side of the casing, a tension link extending between the outer ends of the latter-mentioned arms, strain sensitive gauge elements mounted on said link, and a brake head and shoe unit adjacent the open side of each casing with upper and lower lugs extending into the casing and pivoted to the adjacent ends of said first-mentioned bell crank arms.

* * * * *